United States Patent [19]

Yamada et al.

[11] Patent Number: 4,567,435

[45] Date of Patent: Jan. 28, 1986

[54] METHOD AND APPARATUS FOR CONTINUOUSLY MEASURING DISTANCE UTILIZING EDDY CURRENT AND HAVING TEMPERATURE DIFFERENCE INFLUENCE ELIMINATION

[75] Inventors: Takeo Yamada, Yokohama; Tomohisa Yamamoto, Kawasaki; Seigo Ando, Yokohama; Yoshihiro Kawase, Kawasaki, all of Japan

[73] Assignee: Nippon Kokan Kabushiki Kaisha, Tokyo, Japan

[21] Appl. No.: 583,021

[22] Filed: Feb. 23, 1984

[30] Foreign Application Priority Data

Mar. 9, 1983 [JP] Japan ................................. 58-37259

[51] Int. Cl.$^4$ ....................... G01B 7/14; G01F 23/00; G01R 33/12
[52] U.S. Cl. .................................... 324/207; 324/225; 324/241; 340/618
[58] Field of Search ............... 324/204, 207, 208, 225, 324/239–243, 329; 73/290 R; 340/618

[56] References Cited

U.S. PATENT DOCUMENTS 4,283,680 8/1981 Kerr ..................................... 324/225

FOREIGN PATENT DOCUMENTS 30867 3/1979 Japan ................................. 324/225
57-192805 11/1982 Japan .

*Primary Examiner*—Gerard R. Strecker

*Attorney, Agent, or Firm*—Frishauf, Holtz, Goodman & Woodward

[57] ABSTRACT

The distance between the tip of a probe and a high-temperature object of measurement is continuously and accurately measured by arranging the probe comprising a primary coil and a pair of secondary coils substantially vertically to the object of measurement; inducing an AC voltage ($e_1$) and an AC voltage ($e_2$) respectively in the pair of secondary coils by means of an AC magnetic field of the primary coil excited by an output voltage ($e_{out}$) of a positive feedback amplifier; generating an eddy current in the object of measurement by means of the AC magnetic field of the primary coil to generate another AC magnetic field in the direction opposite to that of the AC magnetic field of the primary coil; impressing an equal DC voltage onto each of the pair of secondary coils to detect respectively a DC voltage ($E_1$) and a DC voltage ($E_2$) of the pair of secondary coils; calculating an error voltage ($e_4$) corresponding to the difference in temperature between the pair of secondary coils, on the basis of the output voltage ($e_{out}$) and a value of difference ($E_3$) between the DC voltages ($E_1$) and ($E_2$); and feeding a value of difference ($e_3''$) between the error voltage ($e_4$) and a value of difference ($e_3$) between the AC voltages ($e_1$) and ($e_2$), back to the positive feedback amplifier, thereby determining the output voltage ($e_{out}$) of the positive feedback amplifier, from which the influence of the difference in temperature between the pair of secondary coils has been eliminated.

2 Claims, 3 Drawing Figures

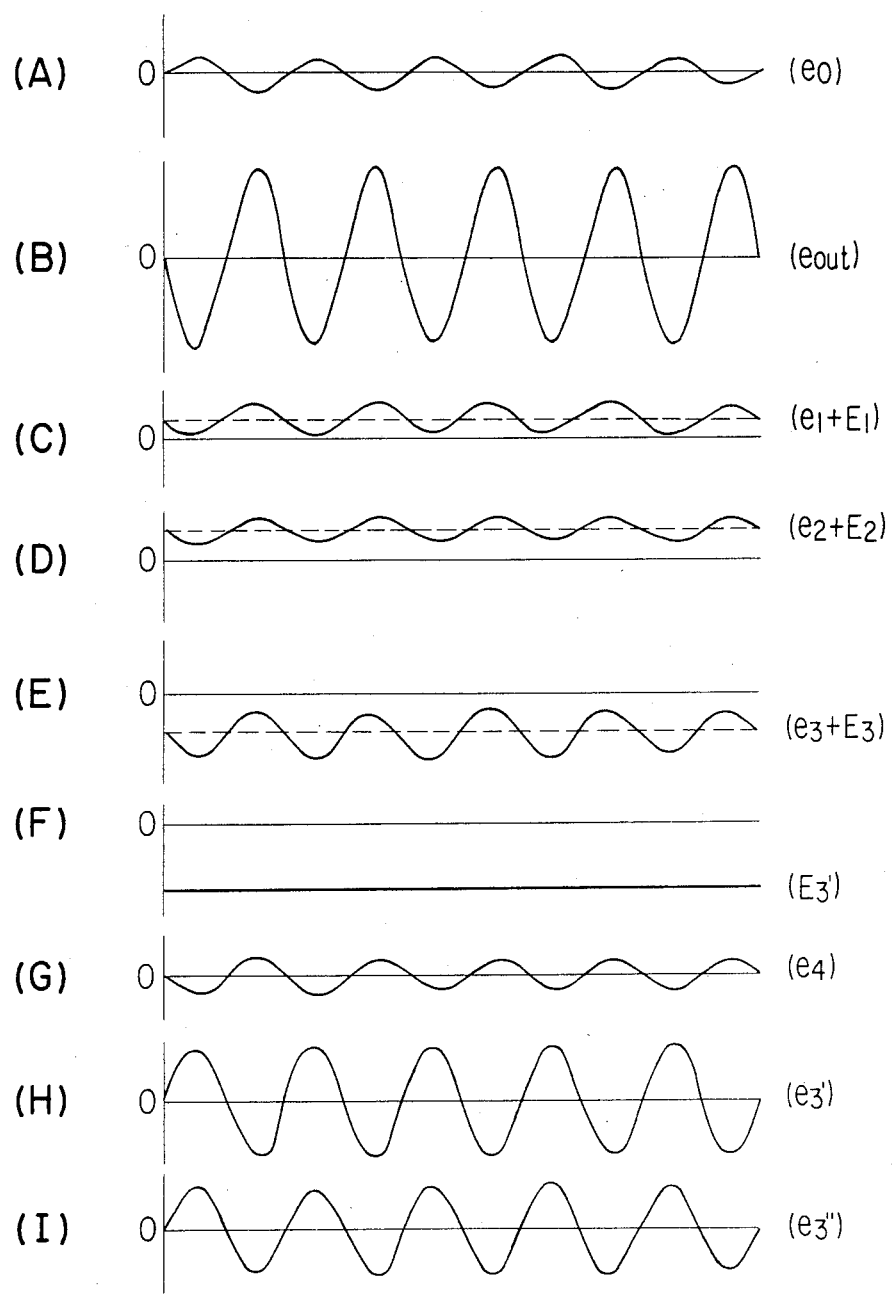

METHOD AND APPARATUS FOR CONTINUOUSLY MEASURING DISTANCE UTILIZING EDDY CURRENT AND HAVING TEMPERATURE DIFFERENCE INFLUENCE ELIMINATION

REFERENCE TO PATENTS, APPLICATIONS AND PUBLICATIONS PERTINENT TO THE INVENTION

Japanese Patent Provisional Publication No. 57-192,805 which is discussed hereafter under the heading of the "BACKGROUND OF THE INVENTION".

FIELD OF THE INVENTION

The present invention relates to a method and an apparatus which allows continuous and accurate measurement of the distance between a high-temperature conductive object of measurement and the tip of a probe which comprises a primary coil and a pair of secondary coils provided on the both sides of the primary coil, even when a difference in temperature between the pair of secondary coils of the probe is caused by the heat of the high-temperature conductive object of measurement, without being affected by the above-mentioned difference in temperature.

BACKGROUND OF THE INVENTION

In order to manufacture a cast strand free from a surface defect by means of, for example, a vertical type continuous casting machine, it is essential to minimize variations in the surface height of molten steel in a mold. For this purpose, it is necessary to continuously and accurately measure the surface height of the molten steel in the mold. The surface height of the molten steel in the mold can be determined by measuring the distance between the tip of a probe arranged substantially vertically to the surface of the molten steel at a distance therefrom and the surface of the molten steel.

An example of the method for measuring the above-mentioned distance is disclosed in Japanese Patent Provisional Publication No. 57-192,805 (hereinafter referred to as the "prior art"). The prior art is described below with reference to FIG. 1.

As shown in FIG. 1, an AC power source 1 impresses an AC voltage having a prescribed frequency and a prescribed amplitude onto a positive feedback amplifier 2. The positive feedback amplifier 2 has a feedback path comprising a probe 3 and an AC voltage amplifier 9. The probe 3 comprises a bobbin 4, a primary coil 5 provided coaxially with the bobbin 4 at the center thereof, and a pair of secondary coils 6 and 6' each provided at each of the end portions of the bobbin 4 coaxially therewith on the both sides of the primary coil 5 at equal distance therefrom. The probe 3 is arranged substantially vertically to the surface of molten steel 8 in a mold 7 at a distance therefrom. The primary coil 5 is excited by means of an output voltage ($e_{out}$) of the positive feedback amplifier 2, whereby an AC voltage ($e_1$) and an AC voltage ($e_2$) are induced respectively in the pair of secondary coils 6 and 6'. The pair of secondary coils 6 and 6' are differentially connected to each other with equal winding turns. The AC voltage amplifier 9 amplifies a value of difference ($e_3$) between the AC voltage ($e_1$) and the AC voltage ($e_2$) induced respectively in the pair of secondary coils 6 and 6', and feeds the thus amplified value of difference ($e_3'$) of the value of difference ($e_3$) back to the positive feedback amplifier 2.

In the above-mentioned apparatus for continuously measuring the distance utilizing an eddy current of the prior art, an AC voltage having a prescribed frequency and a prescribed amplitude is impressed from the AC power source 1 onto the positive feedback amplifier 2. An output voltage ($e_{out}$) of the positive feedback amplifier 2 is impressed onto the primary coil 5 of the probe 3. As a result, an AC magnetic field is generated by means of the primary coil 5. Lines of magnetic force of the AC magnetic field interlink with the pair of secondary coils 6 and 6' to induce an AC voltage ($e_1$) and an AC voltage ($e_2$) respectively in the pair of secondary coils 6 and 6'. Simultaneously with the interlinkage with the pair of secondary coils 6 and 6', the lines of magnetic force pass through the molten steel 8 to generate an eddy current in the molten steel 8. This causes generation of another AC magnetic field in the direction opposite to that of the above-mentioned AC magnetic field of the primary coil 5. As a result, part of the lines of magnetic force of the primary coil 5 interlinking with the pair of secondary coils 6 and 6' is offset, and the number of the lines of magnetic force thus decreases. The rate of this decrease in the number of the lines of magnetic force is larger for the lower secondary coil 6' than for the upper secondary coil 6, because the number of the lines of magnetic force generated by means of the another AC magnetic field of the eddy current and linking with the pair of secondary coils 6, 6' is larger for the lower secondary coil 6' than for the upper secondary coil 6. This results in a difference ($e_3$) between the AC voltage ($e_1$) and the AC voltage ($e_2$) induced respectively in the pair of secondary coils 6 and 6'. Since the pair of secondary coils 6 and 6' are differentially connected to each other, the value of difference ($e_3$) between the pair of secondary coils 6 and 6' is continuously impressed onto the AC voltage amplifier 9. This value of difference ($e_3$) is amplified by the AC voltage amplifier 9. The amplified value of difference ($e_3'$) is continuously fed back to the positive feedback amplifier 2.

The amplified value of difference ($e_3'$) varies in response to the distance (l) between the tip of the probe 3 and the surface of the molten steel 8, and the output voltage ($e_{out}$) of the positive feedback amplifier 2 varies in response to the amplified value of difference ($e_3'$). It is therefore possible to continuously measure the distance (l) between the tip of the probe 3 and the surface of the molten steel 8 by continuously detecting the output voltage ($e_{out}$) of the positive feedback amplifier 2.

The above-mentioned prior art has the following drawbacks. When there is no temperature difference between the pair of secondary coils 6 and 6', the increments by thermal expansion of the respective cross-sectional areas of the pair of secondary coils 6 and 6' are equal to each other. Therefore, the amplified value of difference ($e_3'$) between the pair of secondary coils 6 and 6' fed back to the positive feedback amplifier 2 shows no variation. When measuring the surface height of the molten steel 8 as mentioned above, however, the lower secondary coil 6' closer to the surface of the molten steel 8 is heated to a higher temperature than the upper secondary coil 6. As a result, the cross-sectional area of the lower secondary coil 6' becomes larger than that of the upper secondary coil 6. The amplified value of difference ($e_{3'}$) fed back to the positive feedback amplifier 2 therefore varies in response to the difference in cross-sectional area between the pair of secondary coils 6 and 6', resulting in a measuring error of the above-mentioned distance (l).

Under such circumstances, there is a demand for developing a method and an apparatus which enable to continuously and accurately measure the distance between a high-temperature conductive object of measurement and the tip of a probe which comprises a primary coil and a pair of secondary coils provided on the both sides of the primary coil, even when a difference in temperature between the pair of secondary coils of the probe is caused by the heat of the high-temperature object of measurement, without being affected by the above-mentioned difference in temperature, but such a method and an apparatus are not as yet proposed.

SUMMARY OF THE INVENTION

An object of the present invention is therefore to provide a method and an apparatus which enable to continuously and accurately measure the distance between a high-temperature conductive object of measurement and the tip of a probe which comprises a primary coil and a pair of secondary coils provided on the both sides of the primary coil, even when a difference in temperature between the pair of secondary coils of the probe is caused by the heat of the high-temperature object of measurement, without being affected by the above-mentioned difference in temperature.

In accordance with one of the features of the present invention, there is provided a method for continuously measuring a distance utilizing an eddy current, which comprises:

arranging a probe comprising a bobbin, a primary coil provided coaxially with said bobbin at the center thereof, and a pair of secondary coils each provided at each of the end portions of said bobbin coaxially therewith on the both sides of said primary coil at equal distances therefrom, substantially vertically to a high-temperature electro-conductive object of measurement at a distance therefrom; exciting said primary coil by means of an output voltage ($e_{out}$) of a positive feedback amplifier; inducing an AC voltage ($e_1$) and an AC voltage ($e_2$) respectively in said pair of secondary coils by means of an AC magnetic field of said excited primary coil; generating an eddy current in said object of measurement by means of said AC magnetic field of said primary coil; generating another AC magnetic field in the direction opposite to that of said AC magnetic field of said primary coil by means of said eddy current; continuously detecting a value of difference ($e_3$), caused by said another AC magnetic field generated by means of said eddy current, between said AC voltage ($e_1$) and said AC voltage ($e_2$) of said pair of secondary coils, which difference ($e_3$) varies in response to variation in the distance (l) between the tip of said probe and said object of measurement;

characterized by:

impressing an equal DC voltage through a DC resistance having an equal resistance value onto each of said pair of secondary coils;

continuously detecting respectively a DC voltage ($E_1$) and a DC voltage ($E_2$) of said pair of secondary coils;

continuously calculating a value of difference ($E_3$) between said DC voltage ($E_1$) and said DC voltage ($E_2$) thus detected;

continuously calculating an error voltage ($e_4$) corresponding to the difference in temperature between said pair of secondary coils, on the basis of said value of difference ($E_3$) between said DC voltage ($E_1$) and said DC voltage ($E_2$), and said output voltage ($e_{out}$) of said positive feedback amplifier;

continuously calculating a value of difference ($e_{3''}$) between said calculated error voltage ($e_4$) corresponding to said difference in temperature between said pair of secondary coils, on the one hand, and said value of difference ($e_3$) between said AC voltage ($e_1$) and said AC voltage ($e_2$) of said pair of secondary coils, on the other hand; and feeding said calculated value of difference ($e_{3''}$) back to said positive feedback amplifier, and continuously determining said output voltage ($e_{out}$) of said positive feedback amplifier, from which the influence of said difference in temperature between said pair of secondary coils has been eliminated, thereby continuously and accurately measuring the distance (l) between the tip of said probe and said object of measurement by using said determined output voltage ($e_{out}$) of said positive feedback amplifier.

BRIEF DESCRIPTION OF THE DRAWINGS

FIG. 3 is a voltage wave-form diagram for the individual parts of FIG. 2.

DETAILED DESCRIPTION OF PREFERRED EMBODIMENTS

From the above-mentioned point of view, extensive studies were carried out to develop a method and an apparatus which enable to continuously and accurately measure the distance between a high-temperature conductive object of measurement and the tip of a probe which comprises a primary coil and a pair of secondary coils provided on the both sides of the primary coil, even when a difference in temperature between the pair of secondary coils of probe is caused by the heat of the high-temperature object of measurement, without being affected by the above-mentioned difference in temperature. As a result, the following finding was obtained. The difference in cross-sectional area between the pair of secondary coils varies in response to the difference in temperature between the pair of secondary coils, and the difference in DC resistance between the pair of secondary coils varies in response to the above-mentioned difference in temperature. Therefore, the above-mentioned difference in cross-sectional area varies in response to the difference in DC voltage between the pair of secondary coils. It is therefore possible to continuously and accurately measure the distance between the tip of the probe and the high-temperature electro-conductive object of measurement, even when the difference in temperature between the pair of secondary coils of the probe is caused by the heat of the high-temperature object of measurement, without being affected by the above-mentioned difference in temperature, by continuously calculating the above-mentioned difference in DC voltage, continuously calculating an error voltage corresponding to this difference in DC voltage, continuously calculating a value of difference between this error voltage and the difference in induced voltage between the pair of secondary coils, and feeding the thus calculated value of difference back to the positive feedback amplifier.

The present invention was made on the basis of the above-mentioned finding. The method and the apparatus for continuously measuring the distance utilizing an eddy current of the present invention are described below with reference to the drawings.

Figure 1:
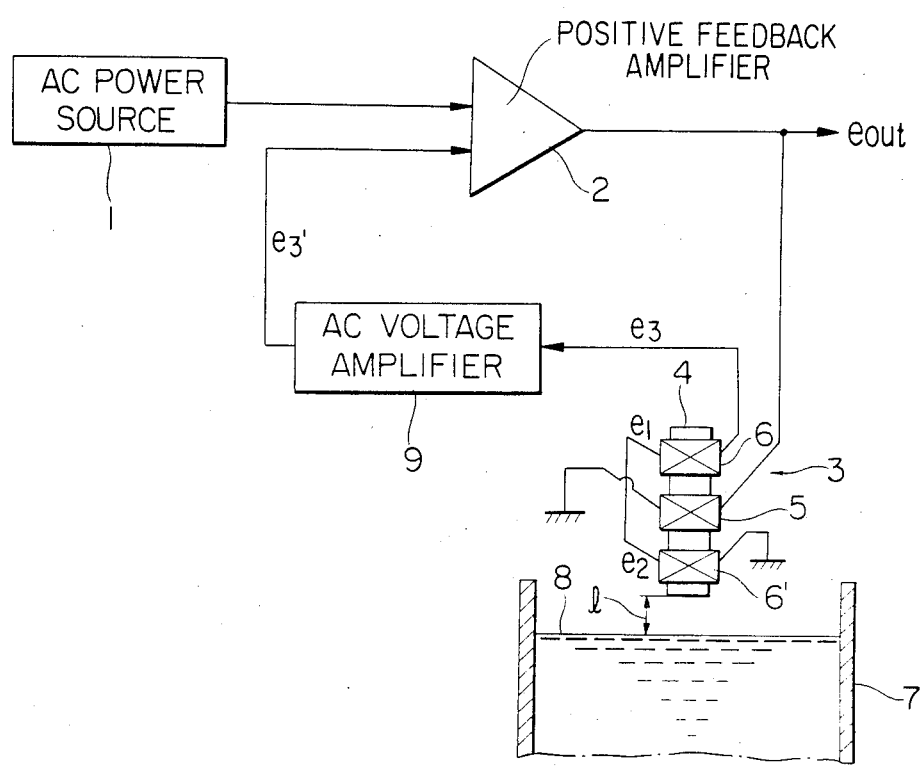
FIG. 1 is a block diagram illustrating the method of the prior art.
Figure 2:
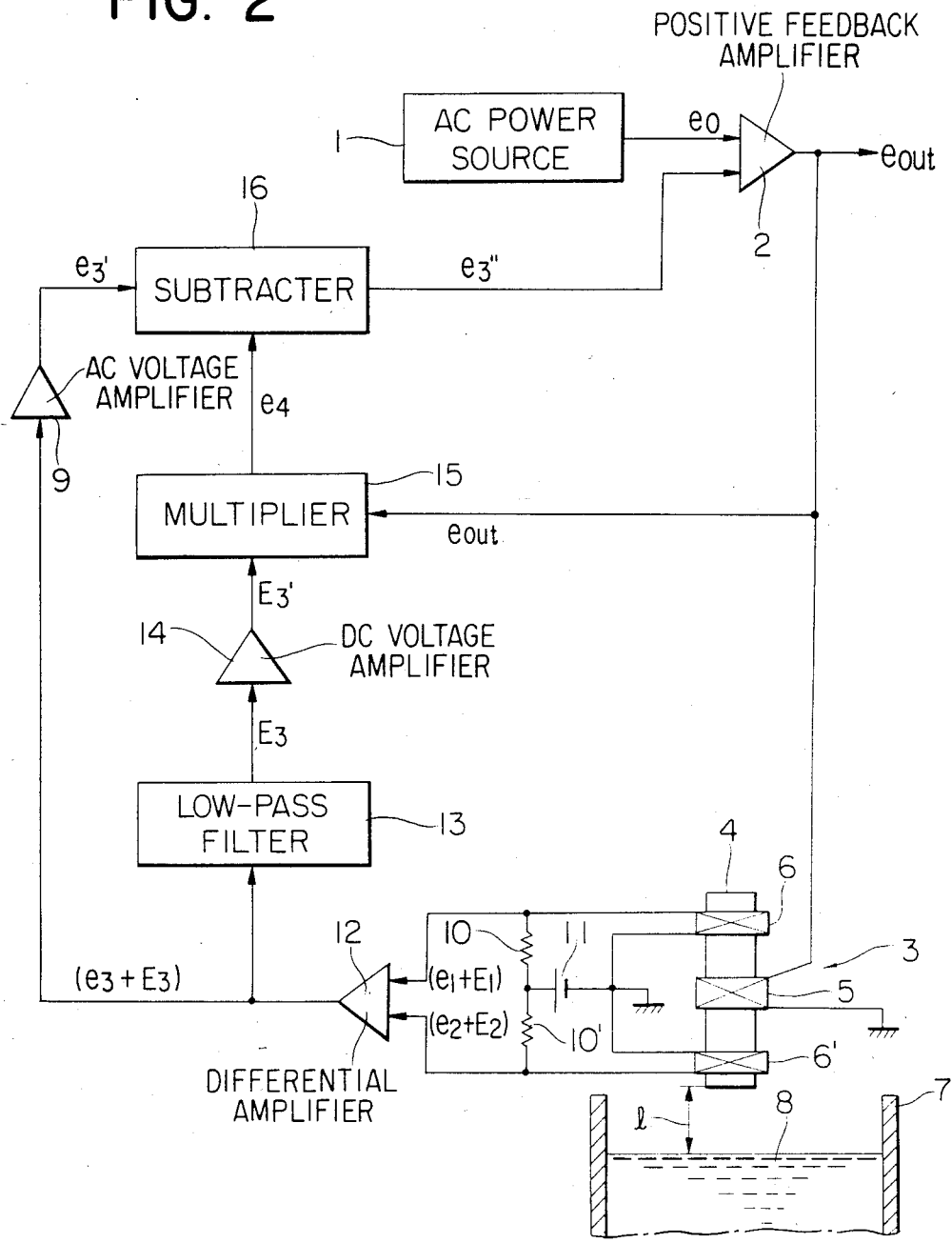
FIG. 2 is a block diagram illustrating an embodiment for carrying out the method of the present invention.

FIG. 2 is a block diagram illustrating an embodiment for carrying out the method of the present invention, and FIG. 3 is a voltage wave-form diagram for the individual parts of FIG. 2. As shown in FIG. 2, an AC power source 1 impresses an AC voltage ($e_o$) having a prescribed frequency and a prescribed amplitude (see "A" in FIG. 3) onto a positive feedback amplifier 2. The positive feedback amplifier 2 has a feedback path which comprises a probe 3 connected in series with a DC power source 11 and a DC resistance 10, 10', a differential amplifier 12, a low-pass filter 13, a DC voltage amplifier 14, an AC voltage amplifier 9, a multiplier 15 and a subtracter 16.

The probe 3 comprises a bobbin 4, a primary coil 5 provided coaxially with the bobbin 4 at the center thereof, and a pair of secondary coils 6 and 6' each having equal winding turns and each provided at each of the end portions of the bobbin 4 coaxially therewith on the both sides of the primary coil 5 at equal distances therefrom. The probe 3 is arranged substantially vertically to the surface of molten steel 8 in a mold 7 at a distance therefrom. The primary coil 5 is excited by means of an output voltage ($e_{out}$) (see "B" in FIG. 3) of the positive feedback amplifier 2, whereby an AC voltage ($e_1$) and an AC voltage ($e_2$) are induced respectively in the pair of secondary coils 6 and 6'.

The DC resistance 10 is connected in series to the upper secondary coil 6 out of the pair of secondary coils 6 and 6' to detect a DC voltage ($E_1$) between the both ends of the upper secondary coil 6, and the DC resistance 10' having the same resistance value as that of the DC resistance 10 is connected in series to the lower secondary coil 6' out of the pair of secondary coils 6 and 6', to detect a DC voltage ($E_2$) between the both ends of the lower secondary coil 6'. The DC power source 11 impresses an equal DC voltage through the DC resistances 10 and 10' onto the pair of secondary coils 6 and 6'.

The differential amplifier 12 continuously calculates a value of difference ($e_3+E_3$)(see "E" in FIG. 3) between a composite voltage ($e_1+E_1$)(see "C" in FIG. 3) of the AC voltage ($e_1$) and the DC voltage ($E_1$) of the upper secondary coil 6, on the one hand, and a composite voltage ($e_2+E_2$)(see "D" in FIG. 3) of the AC voltage ($e_2$) and the DC voltage ($E_2$) of the lower secondary coil 6'. The low-pass filter 13 passes only a value of difference ($E_3$) between the DC voltage ($E_1$) and the DC voltage ($E_2$), out of the value of difference ($e_3+E_3$) between the composite voltage ($e_1+E_1$) and the composite voltage ($e_2+E_2$), calculated by the differential amplifier 12.

The DC voltage amplifier 14 amplifies the value of difference ($E_3$) between the DC voltage ($E_1$) and the DC voltage ($E_2$), which has passed through the low-pass filter 13 to a prescribed value ($E_3'$)(see "F" in FIG. 3). The multiplier 15 continuously calculates a value of the product of the value of difference ($E_3'$) amplified by the DC voltage amplifier 14 and the output voltage ($e_{out}$) of the positive feedback amplifier 2, i.e., an error voltage ($e_4$)(see "G" in FIG. 3) corresponding to the difference in temperature between the pair of secondary coils 6 and 6'.

The AC voltage amplifier 9 amplifies only the value of difference ($e_3$) between the AC voltage ($e_1$) and the AC voltage ($e_2$) of the pair of secondary coils 6 and 6', out of the value of difference ($e_3+E_3$) calculated by the differential amplifier 12, to the prescribed value ($E_3'$)(see "H" in FIG. 3). The subtracter 16 continuously calculates a value of difference ($e_{3''}$)(see "I" in FIG. 3) between the calculated error voltage ($e_4$), which has been calculated by the multiplier 15, corresponding to the difference in temperature between the pair of secondary coils 6 and 6', on the one hand, and the value of difference ($e_{3'}$), which has been amplified by the AC voltage amplifier 9, between the AC voltage ($e_1$) and the AC voltage ($e_2$)

The error voltage ($e_4$) is correlated with the difference in temperature between the pair of secondary coils 6 and 6' as follows. Out of the pair of secondary coils 6 and 6', only the lower secondary coil 6' is heated to a prescribed temperature so that there is a temperature difference between the pair of secondary coils 6 and 6', and an output voltage ($e_{out}$) of the positive feedback amplifier 2 is detected at this moment. Since the difference in temperature between the secondary coils 6 and 6' is almost linearly correlated with the output voltage ($e_{out}$), the degree of amplification of the DC voltage amplifier 14 is adjusted so that the output voltage ($e_{out}$) becomes equal to the output voltage ($e_{out}$) in the absence of the temperature difference between the pair of secondary coils 6 and 6'.

In the above-mentioned apparatus for continuously measuring a distance utilizing an eddy current of the present invention, the AC power source 1 impresses an AC voltage ($e_o$) having a prescribed frequency and a prescribed amplitude onto the positive feedback amplifier 2. The output voltage ($e_{out}$) of the positive feedback amplifier 2 is impressed onto the primary coil 5. As a result, an AC magnetic field is generated by means of the primary coil 5. The lines of magnetic force of this AC magnetic field of the primary coil 5 interlink with the pair of secondary coils 6 and 6' to induce an Ac voltage ($e_1$) and an AC voltage ($e_2$) respectively in the pair of secondary coils 6 and 6'. Since, simultaneously with the interlinkage with the pair of secondary coils 6 and 6', the lines of magnetic force of the primary coil 5 pass through the molten steel 8 to generate an eddy current in the molten steel 8, whereby another AC magnetic field in the direction opposite to that of the above-mentioned AC magnetic field of the primary coil 5 is generated. As a result, part of the lines of magnetic force interlinking with the pair of secondary coils 6 and 6' is offset, and the number of lines of magnetic force thus decreases. The rate of decrease in the number of the lines of magnetic force is larger for the lower secondary coil 6' than for the upper secondary coil 6, out of the pair of secondary coils 6 and 6', as described above under the heading of the "BACKGROUND OF THE INVENTION". This results in a difference between the AC voltage ($e_1$) and the AC voltage ($e_2$) induced respectively in the pair of secondary coils 6 and 6'.

In the upper secondary coil 6, a composite voltage ($e_1+E_1$) comprising the AC voltage ($e_1$) and the DC voltage ($E_1$) corresponding to the value of DC resistance 10 of the upper secondary coil 6 is generated. In the lower secondary coil 6', a composite voltage ($e_2+E_2$) comprising the AC voltage ($e_2$) and the DC voltage ($E_2$) corresponding to the value of DC resistance 10' of the lower secondary coil 6'. These composite voltages ($e_1+E_1$) and ($e_2+E_2$) are impressed onto the differential amplifier 12 which continuously calculates a value of difference ($e_3+E_3$) between the composite voltage ($e_1+E_1$) and the composite voltage ($e_2+E_2$). The value of difference ($e_3+E_3$) is impressed onto the low-pass filter 13, and out of the value of difference ($e_3+E_3$), only the value of difference ($E_3$) between the DC voltage ($E_1$) and the DC voltage ($E_2$) passes through the low-pass filter 13. The value of difference ($E_3$) which has passed through the low-pass filter 13 is impressed onto the DC voltage amplifier 14 and amplified. The value of difference ($E_3'$) thus amplified by the DC voltage amplifier 14 and the output voltage ($e_{out}$) of the positive feedback amplifier 2 are impressed onto the multiplier 15 which continuously calculates the error voltage ($e_4$) corresponding to the difference in temperature between the pair of secondary coils 6 and 6'.

The value of difference ($e_3+E_3$) calculated by the differential amplifier 12 is impressed onto the AC voltage amplifier 9, and only the value of difference ($e_3$) between the AC voltage ($e_1$) and the AC voltage ($e_2$) of the pair of secondary coils 6 and 6' is amplified. The value of difference ($e_3'$) amplified by the AC voltage amplifier 9 and the error voltage ($e_4$), corresponding to the difference in temperature between the pair of secondary coils 6 and 6', calculated by the multiplier 15 are impressed onto the subtracter 16 which continuously calculates the value of difference ($e_3''$) between the value of difference ($e_3'$) and the error voltage ($e_4$). The value of difference ($e_3''$) calculated by the subtracter 16 is fed back to the positive feedback amplifier 2. The output voltage ($e_{out}$) of the positive feedback amplifier 2, from which the influence of the difference in temperature between the pair of secondary coils 6 and 6' has been eliminated, is thus determined, and the distance (l) between the tip of the probe 3 and the surface of the molten steel 8 is continuously and accurately measured by using the thus determined output voltage ($e_{out}$) of the positive feedback amplifier 2.

In the above-mentioned embodiment, the case of continuously measuring the distance between the tip of the probe and the surface of the molten steel in the mold has been described. It is however needless to mention that the method and the apparatus of the present invention are applicable also in the case of continuously measuring the distance between the tip of the probe and a high-temperature conductive object of measurement other than molten steel.

According to the present invention, as described above in detail, it is possible to continuously and accurately measure the distance between the tip of a probe and a high-temperature conductive object of measurement, even when a difference in temperature between secondary coils of the probe is caused by the heat of the high-temperature object of measurement, without being affected by the difference in temperature, thus providing industrially very useful effects.

What is claimed is:

1. A method for continuously measuring a distance utilizing an eddy current, which comprises:
    arranging a probe comprising a bobbin, a primary coil provided coaxially with said bobbin at the center thereof, and a pair of secondary coils each provided at each of the end portions of said bobbin coaxially therewith on the both sides of said primary coil at equal distances therefrom, substantially vertically to a high-temperature electro-conductive object of measurement at a distance therefrom; exciting said primary coil by means of an output voltage ($e_{out}$) of a positive feedback amplifier; inducing an AC voltage ($e_1$) and an AC voltage ($e_2$) respectively in said pair of secondary coils by means of an AC magnetic field of said excited primary coil; generating an eddy current in said object of measurement by means of said AC magnetic field of said primary coil; generating another AC magnetic field in the direction opposite to that of said AC magnetic field of said primary coil by means of said eddy current; continuously detecting a value of difference ($e_3$), caused by said another AC magnetic field generated by means of said eddy current, between said AC voltage ($e_1$) and said AC voltage ($e_2$) of said pair of secondary coils, which difference ($e_3$) varies in response to variation in the distance (l) between the tip of said probe and said object of measurement;

characterized by:
impressing an equal DC voltage through a DC resistance having an equal resistance value onto each of said pair of secondary coils;
continuously detecting respectively a DC voltage ($E_1$) and a DC voltage ($E_2$) of said pair of secondary coils;
continuously calculating a value of difference ($E_3$) between said DC voltage ($E_1$) and said DC voltage ($E_2$) thus detected;
continuously calculating an error voltage ($e_4$) corresponding to the difference in temperature between said pair of secondary coils, on the basis of said value of difference ($E_3$) between said DC voltage ($E_1$) and said DC voltage ($E_2$), and said output voltage ($e_{out}$) of said positive feedback amplifier;
continuously calculating a value of difference ($e_3''$) between said calculated error voltage ($e_4$) corresponding to said difference in temperature between said pair of secondary coils, on the one hand, and said value of difference ($e_3$) between said AC voltage ($e_1$) and said AC voltage ($e_2$) of said pair of secondary coils, on the other hand; and
feeding said calculated value of difference ($e_3''$) back to said positive feedback amplifier, and continuously determining said output voltage ($e_{out}$) of said positive feedback amplifier, from which the influence of said difference in temperature between said pair of secondary coils has been eliminated, thereby continuously and accurately measuring the distance (l) between the tip of said probe and said object of measurement by using said determined output voltage ($e_{out}$) of said positive feedback amplifier.

2. In an apparatus for continuously measuring a distance utilizing an eddy current, which comprises:
    a probe comprising a bobbin, a primary coil provided coaxially with said bobbin at the center thereof, and a pair of secondary coils each provided at each of the end portions of said bobbin coaxially therewith on the both sides of said primary coil at equal distances therefrom, said probe being arranged substantially vertically to a high-temperature electro-conductive object of measurement at a distance therefrom; a positive feedback amplifier for exciting said primary coil by means of an output voltage ($e_{out}$) of said positive feedback amplifier, an AC voltage ($e_1$) and an AC voltage ($e_2$) being induced respectively in said pair of secondary coils by means of an AC magnetic field of said excited primary coil, an eddy current being generated in said object of measurement by means of said AC magnetic field of said primary coil, and another AC magnetic field in the direction opposite to that of said AC magnetic field of said primary coil being generated by means of said eddy current to produce a value of difference ($e_3$), caused by said another AC magnetic field generated by means of said eddy current, between said AC voltage ($e_1$) and said AC voltage ($e_2$) of said pair of secondary coils, said detected value of difference ($e_3$) varying in response to variation in the distance (1) between the tip of said probe and said object of measurement; and an AC power source for impressing an AC voltage having a prescribed frequency and a prescribed amplitude onto said positive feedback amplifier;

the improvement comprising:

a DC power source (11) for impressing an equal DC voltage through a DC resistance (10, 10') having an equal resistance value onto each of said pair of secondary coils (6, 6'), a DC voltage ($E_1$) and a DC voltage ($E_2$) being generated respectively in said pair of secondary coils (6, 6') by means of said DC voltage of said DC power source (11);

a differential amplifier (12) for continuously calculating a value of difference ($e_3+E_3$) between a composite voltage ($e_1+E_1$) of said AC voltage ($e_1$) and said DC voltage ($E_1$) of one (6) of said pair of secondary coils (6, 6'), on the one hand, and a composite voltage ($e_2+E_2$) of said AC voltage ($e_2$) and said DC voltage ($E_2$) of the other one (6') of said pair of secondary coils (6, 6'), on the other hand;

a low-pass filter (13) for passing only a value of difference ($E_3$) between said DC voltage ($E_1$) and said DC voltage ($E_2$), out of said value of difference ($e_3+E_3$) between said composite voltage ($e_1+E_1$) and said composite voltage ($e_2+E_2$);

a DC voltage amplifier (14) for amplifying said value of difference ($E_3$) between said DC voltage ($E_1$) and said DC voltage ($E_2$), which has passed through said low-pass filter (13);

another means (15) for continuously calculating an error voltage ($e_4$) corresponding to the difference in temperature between said pair of secondary coils (6, 6'), on the basis of the thus amplified value of difference ($E_3'$) of said value of difference ($E_3$) between said DC voltage ($E_1$) and said DC voltage ($E_2$), and said output voltage ($e_{out}$) of said positive feedback amplifier (2);

a further another means (9) for passing only said value of difference ($e_3$) between said AC voltage ($e_1$) and said AC voltage ($e_2$) of said pair of secondary coils (6, 6'), out of said value of difference ($e_3+E_3$) calculated by said differential amplifier (12); and a subtracter (16) for continuously calculating a value of difference ($e_3''$) between said calculated error voltage ($e_4$) corresponding to said difference in temperature between said pair of secondary coils (6, 6'), on the one hand, and said value of difference ($e_3$), which has passed through said another means (9), between said AC voltage ($e_1$) and said AC voltage ($e_2$) of said pair of secondary coils (6, 6'), on the other hand, said value of difference ($e_3''$) calculated by said subtracter (16) being fed back to said positive feedback amplifier (2), to continuously determine said output voltage ($e_{out}$) of said positive feedback amplifier (2), from which the influence of said difference in temperature between said pair of secondary coils (6, 6') has been eliminated, whereby the distance (l) between the tip of said probe (3) and said object of measurement (8) is continuously and accurately measured by using said determined output voltage ($e_{out}$) of said positive feedback amplifier (2).

* * * * *